United States Patent
Shimamori (10) Patent No.: US 9,385,566 B2
(45) Date of Patent: Jul. 5, 2016

(54) ROTOR OF ELECTRIC MOTOR WITH MAGNETS ATTACHED TO OUTER CIRCUMFERENTIAL SURFACE OF ROTOR CORE, ELECTRIC MOTOR, AND METHOD OF PRODUCING ROTOR OF ELECTRIC MOTOR

(71) Applicant: FANUC CORPORATION, Yamanashi (JP)

(72) Inventor: Takahiro Shimamori, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/623,192

(22) Filed: Feb. 16, 2015

(65) Prior Publication Data

US 2015/0244217 A1     Aug. 27, 2015

(30) Foreign Application Priority Data

Feb. 21, 2014   (JP) .................................. 2014-032162

(51) Int. Cl.
| | |
|---|---|
| H02K 21/12 | (2006.01) |
| H02K 1/27  | (2006.01) |
| H02K 1/28  | (2006.01) |

(52) U.S. Cl.
CPC . *H02K 1/278* (2013.01); *H02K 1/28* (2013.01)

(58) Field of Classification Search
CPC ................................ H02K 1/28; H02K 1/278
USPC .............. 310/156.08, 156.12, 156.13, 156.26
See application file for complete search history.

(56) References Cited

U.S. PATENT DOCUMENTS

| 8,648,513 B2* | 2/2014 | Nakano ................ B62D 5/0403 310/156.01 |
| 8,872,396 B2* | 10/2014 | Sakata ................... H02K 1/278 310/156.12 |
| 9,112,393 B2* | 8/2015 | Jayasoma .............. H02K 1/278 |
| 9,172,278 B2* | 10/2015 | Nakano .................. H02K 1/148 |
| 2002/0162939 A1* | 11/2002 | Heidrich ............... H02K 1/278 248/683 |

(Continued)

FOREIGN PATENT DOCUMENTS

| JP | 2005020892 A | 1/2005 |
| JP | 2009044797 A | 2/2009 |

(Continued)

OTHER PUBLICATIONS

English Translation of Japanese Publication No. 2013251968, published Dec. 12, 2013, 22 pages.

(Continued)

*Primary Examiner* — Hanh Nguyen (74) *Attorney, Agent, or Firm* — Fredrikson & Byron, P.A.

(57) ABSTRACT

A rotor of the present invention comprises a cylindrically shaped rotor core, and a plurality of magnets arranged at predetermined intervals at an outer circumferential surface of the rotor core. The outer circumferential surface of the rotor core is formed with a plurality of projections for positioning the plurality of magnets in the circumferential direction, and each of the projections extends over only part of outer circumferential surface of the rotor core in the height direction. The rotor core includes a projection-equipped cylindrical part which has an outer circumferential surface over which the plurality of projections extend, and a projection-less cylindrical part which has an outer circumferential surface over which the plurality of projections do not extend.

9 Claims, 7 Drawing Sheets

(56) References Cited

U.S. PATENT DOCUMENTS

| | | | |
|---|---|---|---|
| 2008/0185930 A1* | 8/2008 | Ahrens | H02K 1/278 310/156.08 |
| 2009/0261677 A1* | 10/2009 | Ishikawa | H02K 1/278 310/156.12 |
| 2009/0267438 A1* | 10/2009 | Murakami | H02K 1/278 310/156.28 |
| 2011/0127870 A1* | 6/2011 | Onda | H02K 1/278 310/156.12 |
| 2013/0342064 A1* | 12/2013 | Park | H02K 1/27 310/156.12 |

FOREIGN PATENT DOCUMENTS

| | | | |
|---|---|---|---|
| JP | 2011135735 A | 7/2011 | |
| JP | 2013165548 A | 8/2013 | |
| JP | 2013251968 A | 12/2013 | |

OTHER PUBLICATIONS

English Translation of Abstract for Japanese Publication No. 2011135735, published Jul. 7, 2011, 1 page.

English Translation of Japanese Publication No. 2009044797, published Feb. 26, 2009, 24 pages.

English Translation of Japanese Publication No. 2005020892, published Jan. 20, 2005, 16 pages.

English abstract for Japanese Publication No. JP 2013-165548, published Aug. 22, 2013, 1 pg.

\* cited by examiner

FIG. 11 ved a rotor of an electric motor, comprising a cylindrically shaped rotor core, and a plurality of magnets which are arranged at predetermined intervals at an outer circumferential surface of the rotor core, wherein the outer circumferential surface of the rotor core is formed with a plurality of projections for positioning the plurality of magnets in the circumferential direction of the rotor core, each of the plurality of projections extends over only part of the outer circumferential surface of the rotor core in a height direction parallel to the rotation axis of the rotor core, and the rotor core includes a projection-equipped cylindrical part which has an outer circumferential surface over which the plurality of projections extend, and a projection-less cylindrical part which has an outer circumferential surface over which the plurality of projections do not extend.

ROTOR OF ELECTRIC MOTOR WITH MAGNETS ATTACHED TO OUTER CIRCUMFERENTIAL SURFACE OF ROTOR CORE, ELECTRIC MOTOR, AND METHOD OF PRODUCING ROTOR OF ELECTRIC MOTOR

BACKGROUND OF THE INVENTION

1. Field of the Invention

The present invention relates to a rotor of an electric motor with magnets which are attached to an outer circumferential surface of a rotor core, an electric motor, and a method of producing a rotor of an electric motor.

2. Description of the Related Art

In general, an electric motor of a type which has permanent magnets attached to the outer circumferential surface of a rotor core is called an SPM (surface permanent magnet) motor. In relation to this, JP-A-2013-165548 describes a rotor of an SPM motor which has segment type permanent magnets fixed by a thermosetting binder to the outer circumferential surface of a rotor core. In this regard, a conventional SPM motor employs either a magnet with a confronting face toward the rotor core which is formed of a curved surface to follow the outer circumferential surface of the rotor core, or a magnet with a confronting face which is formed of a flat surface. The SPM motor of JP-A-2013-165548 employs the former magnet, but production of such magnet requires an additional process for forming the curved shape confronting face. Therefore, from the viewpoint of the manufacturing costs, magnet with flat confronting face may be advantageous.

Figure 10:
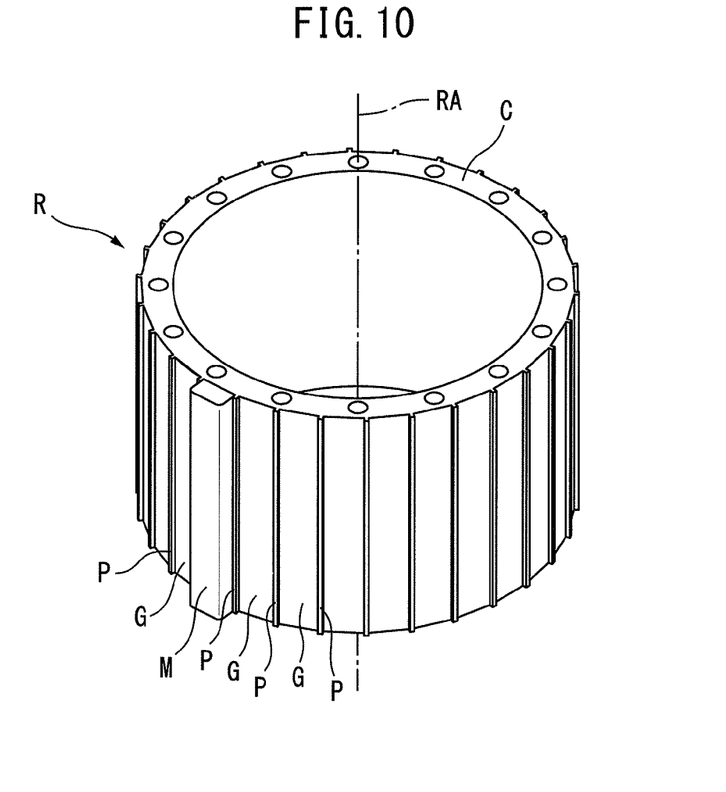
FIG. 10 is a perspective view which shows a conventional rotor.
Figure 11:
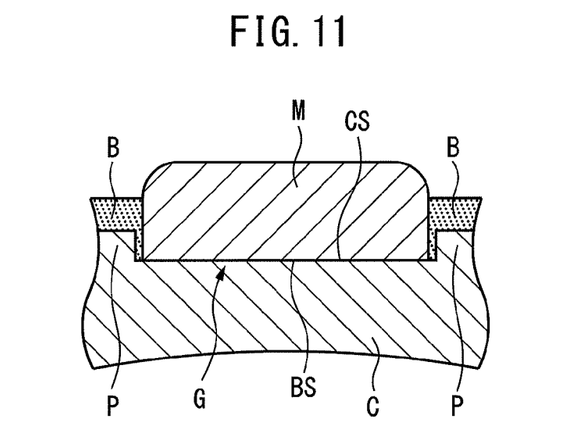
FIG. 11 is an enlarged, cross-sectional view which shows part of the rotor of FIG. 10.

However, accurately placing a magnet with flat confronting face at the rotor core requires formation in advance of guide projections for positioning the magnets at the outer circumferential surface of the rotor core. FIG. 10 is a perspective view which shows a conventional rotor R which has a plurality of guide projections P for positioning a plurality of magnets M. For convenience, FIG. 10 shows only a single magnet M, and the remaining magnets M are omitted. Further, FIG. 11 is an enlarged, cross-sectional view along a plane vertical to a rotation axis RA of the rotor R of FIG. 10, which shows one magnet M and its vicinity. As shown in FIG. 10, the outer circumferential surface of the rotor core C in a conventional rotor R is formed with a plurality of guide grooves G which are arranged at equal intervals in the circumferential direction. Each of the guide grooves G extends along the entire length in the height direction of the rotor core C.

Further, a guide projection P is provided between each two adjoining guide grooves G, G. To form such guide grooves G, groove cutting has to be performed on the entire length of the rotor core C, and therefore the machining man-hour increase and manufacturing costs may also increase due to the increased machining man-hour. Such increased manufacturing costs are particularly prominent in the case where the electric motor has a large number of poles. Further, if the magnets M are attached to the rotor core C after being magnetize, the flat confronting faces CS of the magnets M will closely contact the flat bottom surfaces BS of the guide grooves G due to the attraction force, and therefore, as shown in FIG. 11, the binder B will end up being removed from between these surfaces CS and BS. As a result, the bonding strength acting on the magnets will fall, and therefore the centrifugal force which accompanies rotating motion of the rotor R is liable to cause the magnets M to be scattered from the rotor core C.

A rotor of an electric motor which can reduce the machining man-hour for forming projections for positioning magnets has therefore been sought.

SUMMARY OF THE INVENTION

According to a first aspect of the present invention, there is provided a rotor of an electric motor, comprising a cylindrically shaped rotor core, and a plurality of magnets which are arranged at predetermined intervals at an outer circumferential surface of the rotor core, wherein the outer circumferential surface of the rotor core is formed with a plurality of projections for positioning the plurality of magnets in the circumferential direction of the rotor core, each of the plurality of projections extends over only part of the outer circumferential surface of the rotor core in a height direction parallel to the rotation axis of the rotor core, and the rotor core includes a projection-equipped cylindrical part which has an outer circumferential surface over which the plurality of projections extend, and a projection-less cylindrical part which has an outer circumferential surface over which the plurality of projections do not extend.

According to a second aspect of the invention, there is provided a rotor of an electric motor in the first aspect, wherein the projection-equipped cylindrical part is arranged at each of the both end parts in the height direction of the rotor core.

According to a third aspect of the invention, there is provided a rotor of an electric motor in the first aspect, wherein the projection-equipped cylindrical part is arranged at a center part in the height direction of the rotor core.

According to a fourth aspect of the invention, there is provided a rotor of an electric motor in any one of the first to third aspects, wherein each of the plurality of magnets has a confronting face toward the outer circumferential surface of the rotor core which is formed of a flat surface, and the confronting faces are bonded to the outer circumferential surface of the projection-less cylindrical part.

According to a fifth aspect of the invention, there is provided a rotor of an electric motor in the fourth aspect, wherein the confronting face of each of the plurality of magnets is further bonded to a bottom surface of a groove part which is positioned between two adjoining projections.

According to a sixth aspect of the invention, there is provided a rotor of an electric motor in any one of the first to fifth aspects, wherein the projection-equipped cylindrical part and the projection-less cylindrical part of the rotor core are formed of separate members from each other.

According to a seventh aspect of the invention, there is provided a rotor of an electric motor in the sixth aspect, wherein the projection-less cylindrical part is formed of a laminate body of electrical steel sheets.

According to an eighth aspect of the invention, there is provided an electric motor comprising a rotor in any one of the first to seventh aspects.

According to a ninth aspect of the invention, there is provided a method of producing a rotor of an electric motor in any one of the first to fifth aspects, comprising: preparing a cylindrical member to be worked into the rotor core; performing lathe turning about a center axis of the cylindrical member on the outer circumferential surface of the cylindrical member, so as to form a small diameter part of the cylindrical member, and a large diameter part with an outside diameter larger than the small diameter part; and performing groove cutting along the center axis on the outer circumferential surface of the large diameter part of the cylindrical member, so as to form a groove part which is positioned between two adjoining projections.

According to a 10th aspect of the invention, there is provided a method of producing a rotor of an electric motor in the sixth or seventh aspects, comprising: preparing a cylindrical member to be worked into the projection-equipped cylindrical part; preparing another cylindrical member to be worked into the projection-less cylindrical part; performing groove cutting along a center axis of the cylindrical member on the outer circumferential surface of the cylindrical member, so as to form a groove part which is positioned between two adjoining projections; and joining together the cylindrical member and the other cylindrical member.

These and other objects, features, and advantages of the present invention will become clearer with reference to the detailed description of illustrative embodiments of the present invention which are shown in the attached drawings.

DETAILED DESCRIPTION OF EMBODIMENTS

Below, embodiments of the present invention will be explained in detail with reference to the drawings. Note that the following explanation does not limit the technical scope of the inventions which are described in the claims or the meaning of terms etc.

Figure 1:
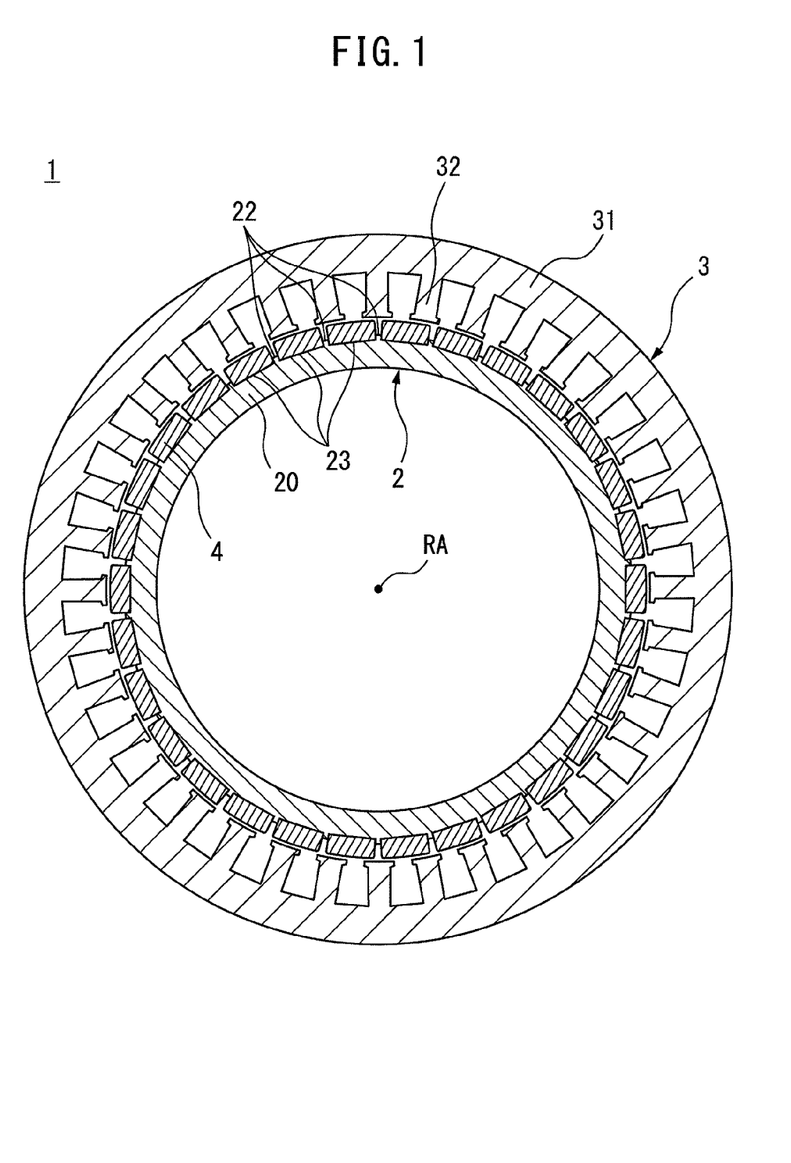
FIG. 1 is a cross-sectional view of an electric motor comprising a rotor of a first embodiment of the present invention.

First, referring to FIG. 1 to FIG. 7, an electric motor comprising a rotor of a first embodiment of the present invention will be explained. The electric motor comprising the rotor of the present embodiment is an electric motor which generates drive force by means of a rotor and a stator interacting with each other. More specifically, the electric motor is an SPM motor which has a structure where permanent magnets are attached at the outer circumferential surface of a rotor core. FIG. 1 is a cross-sectional view of an electric motor 1 comprising an illustrative rotor 2 of the present embodiment. As shown in FIG. 1, the electric motor 1 comprises a rotor 2 which can rotate about a predetermined rotation axis R, and a stator 3 which is arranged concentrically with the rotor 2 so as to surround the rotor 2. The stator 3 according to the present embodiment has a cylindrically shaped yoke part 31, and a plurality of teeth 32 which project out from the yoke part 31 toward the rotor 2. These teeth 32 have a stator winding (not shown) wound around them. The yoke part 31 and plurality of teeth 32 can be formed integrally by stacking electrical steel sheets.

Figure 2:
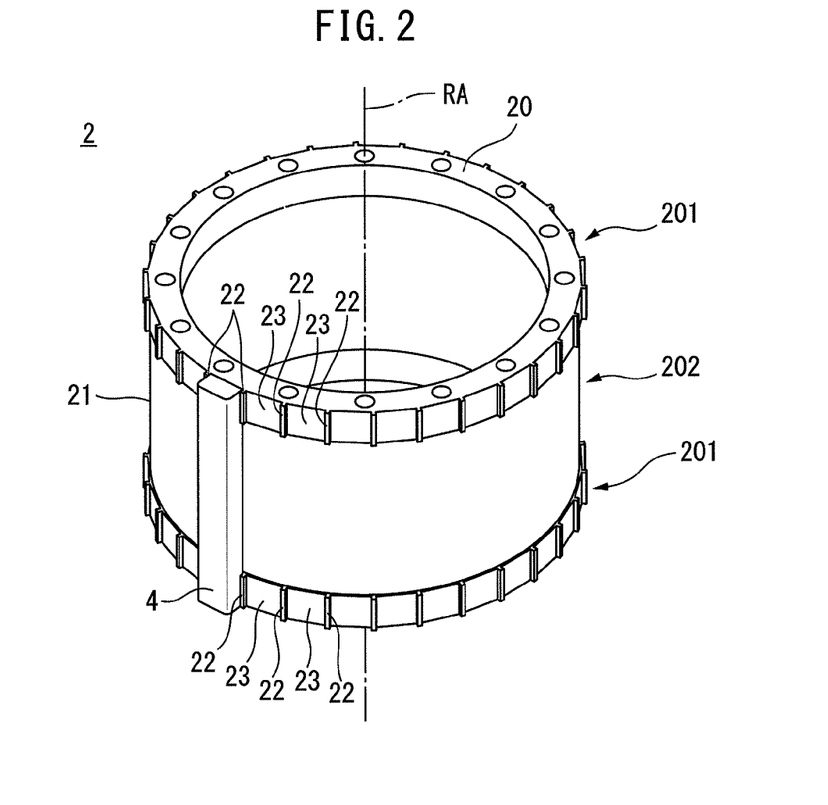
FIG. 2 is a perspective view of the rotor in the electric motor of FIG. 1.

FIG. 2 is a perspective view of a rotor 2 in the electric motor 1 of FIG. 1. As shown in FIG. 1 and FIG. 2, the rotor 2 of the present embodiment has a cylindrically shaped rotor core 20, and a plurality of magnets 4 which are arranged at predetermined intervals at the outer circumferential surface 21 of the rotor core 20. More specifically, the rotor 2 according to the present embodiment has 30 magnets 4 which are arranged at equal intervals in the circumferential direction of the rotor core 20. However, for convenience, FIG. 2 shows only a single magnet 4, and the remaining magnets are omitted. The magnets 4 according to the present embodiment are neodymium magnets or ferrite magnets or other permanent magnets. As shown in FIG. 2, each magnet 4 of the present embodiment has a flat plate shape which extends in parallel with the rotation axis RA of the rotor 2. Further, the magnets 4 of the present example extend across the entire length of the rotor core in the height direction parallel to the rotation axis RA. Further, the magnets 4 of the present example have flat confronting faces toward the outer circumferential surface 21 of the rotor core 20 (see also FIG. 3). Below, the radial direction of the rotor core 20 may be simply referred to as the "radial direction", while the circumferential direction of the rotor core 20 may be simply referred to as the "circumferential direction". Furthermore, the height direction of the rotor core 20 may be simply referred to as the "height direction".

As shown in FIG. 2, a plurality of projections 22 are formed on the outer circumferential surface 21 of the rotor core 20 of the present example for positioning a plurality of magnets 4 in the circumferential direction. More specifically, each of the plurality of projections 22 sticks out from the outer circumferential surface 21 of the rotor core 20 outward in the radial direction so as to pass between two adjoining magnets 4. Therefore, the distance between two adjoining projections 22 becomes equal to the dimension of the magnets 4 in the width direction. The "width direction" herein means the direction vertical to both the height direction and radial direction of the rotor core 20. Further, each of the plurality of magnets 4 is held in a groove 23 which extends between two adjoining projections 22. The grooves 23 have flat bottom surfaces.

As shown in FIG. 2, each of the plurality of projections 22 extends over only part of the outer circumferential surface 21 in the height direction of the rotor core 20. Therefore, the rotor core 20 of the present example includes a cylindrical part which has an outer circumferential surface over which a plurality of projections 22 extend, and a cylindrical part which has an outer circumferential surface over which a plurality of projections 22 do not extend. These cylindrical parts are arranged adjoining each other in the height direction of the rotor core 20. Below, the former cylindrical part in the rotor core 20 may be referred to as a "projection-equipped cylindrical part 201" while the latter cylindrical part may be referred to as a "projection-less cylindrical part 202". FIG. 1 shows the cross-sectional shape of the projection-equipped cylindrical part 201, as the cross-sectional shape of the rotor core 20. As shown in FIG. 2, the rotor core 20 of the present example includes two projection-equipped cylindrical parts 201, 201 which are arranged one by one at both its end parts in the height direction, and one projection-less cylindrical part 202 which is arranged between these projection-equipped cylindrical parts 201, 201. The three cylindrical parts 201, 201, 202 in the rotor core 20 of the present example are formed integrally from various metal pipe materials. Below, the part of the outer circumferential surface 21 of the rotor core 20 corresponding to the projection-less cylindrical part 202 may be referred to as the "outer circumferential surface 212".

Figure 3:
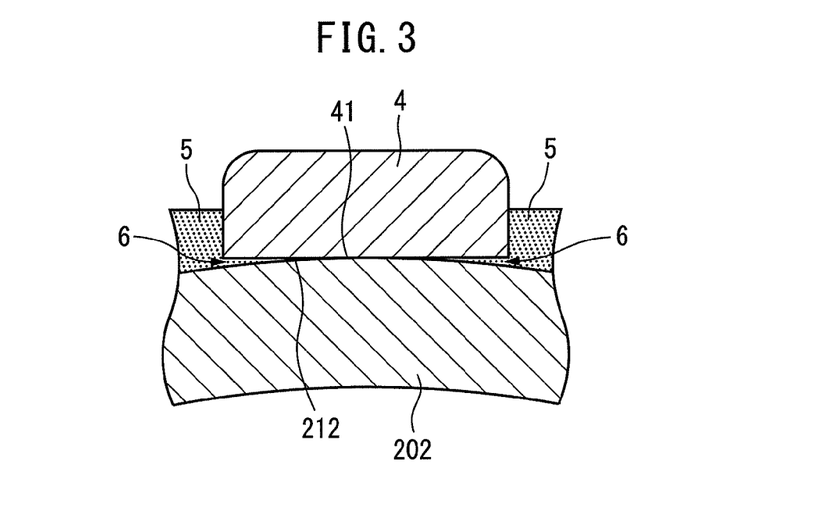
FIG. 3 is an enlarged, cross-sectional view which shows a projection-less cylindrical part of the rotor core in the rotor of FIG. 2.

FIG. 3 is an enlarged, cross-sectional view of the projection-less cylindrical part 202 in the rotor 2 of FIG. 2 along the plane vertical to the rotation axis R, which shows one magnet 4 and its vicinity. As shown in FIG. 3, the magnets 4 of the present example are bonded by a binder 5 to at least the outer circumferential surface 212 of the projection-less cylindrical part 202 of the rotor core 20. As explained above, the confronting faces 41 of the magnets 4 are formed of flat surfaces, but the outer circumferential surface 212 of the projection-less cylindrical part 202 is formed of a curved surface. Therefore, even if these surfaces 41, 212 contact each other, a certain gap will remain between them. More specifically, between the confronting faces 41 of the magnets 4 of the present example and the outer circumferential surface 212 of the projection-less cylindrical part 202, there remains a pair of gaps 6, 6 arranged in the circumferential direction. As shown in FIG. 3, the binder enters the insides of these gaps 6, 6, and therefore it is possible to prevent the binder 5 from being removed from the confronting faces 41 of the magnets 4 and the outer circumferential surface 21 of the rotor core 20. Therefore, according to the rotor core 20 of the present example, it is possible to prevent scattering of the magnets 4 caused by insufficient bonding strength acting on the magnets 4.

Figure 4:
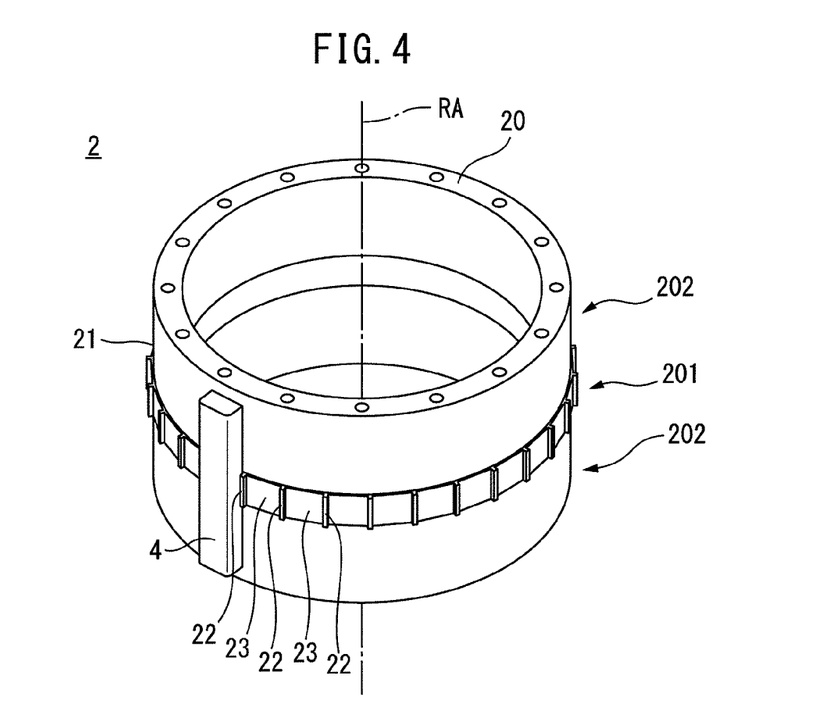
FIG. 4 is a perspective view which shows a modification of a rotor of the present embodiment.

In the above way, according to the rotor 2 of the present embodiment, the formation area where the projections 22 for positioning the magnets 4 are formed is limited to only part of the rotor core 20 in the height direction, more specifically only a projection-equipped cylindrical part 201. Therefore, according to the rotor 2 of the present embodiment, it is possible to minimize the dimensions of the positioning-use projections 22 in the height direction, and therefore it is possible to reduce the machining man-hour for forming these projections 22. Note that, in the rotor 2 of the present embodiment, the number and arrangement of the projection-equipped cylindrical part 201 and the projection-less cylindrical part 202 of the rotor core 20 are not limited to only the example of FIG. 2. That is, the numbers and arrangement of the cylindrical parts at the rotor core 20 can be changed to realize various modifications of the rotor 2. FIG. 4 is a perspective view which shows one modification of the rotor 2 of the present embodiment. As shown in FIG. 4, the rotor core 20 in the rotor 2 of the present example includes a single projection-equipped cylindrical part 201 which is arranged at the center part in the height direction, and a pair of projection-less cylindrical parts 202, 202 which are arranged so as to straddle the projection-equipped cylindrical part 201. In such a modification as well, it is possible to minimize the dimensions of the positioning-use projections 22 in the height direction, and therefore it is possible to reduce the machining man-hour for forming these projections 22.

Figure 5:
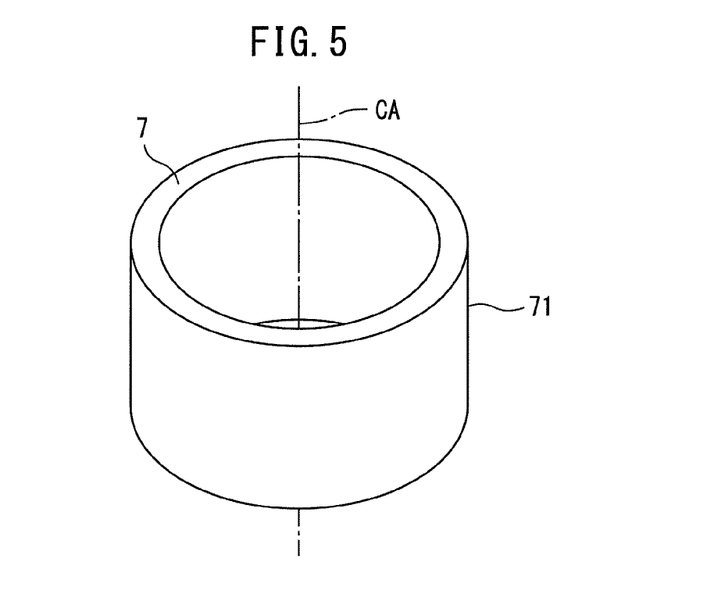
FIG. 5 is a first diagram for explaining a process of forming a core in an illustrative method of producing a rotor of the present embodiment.
Figure 6:
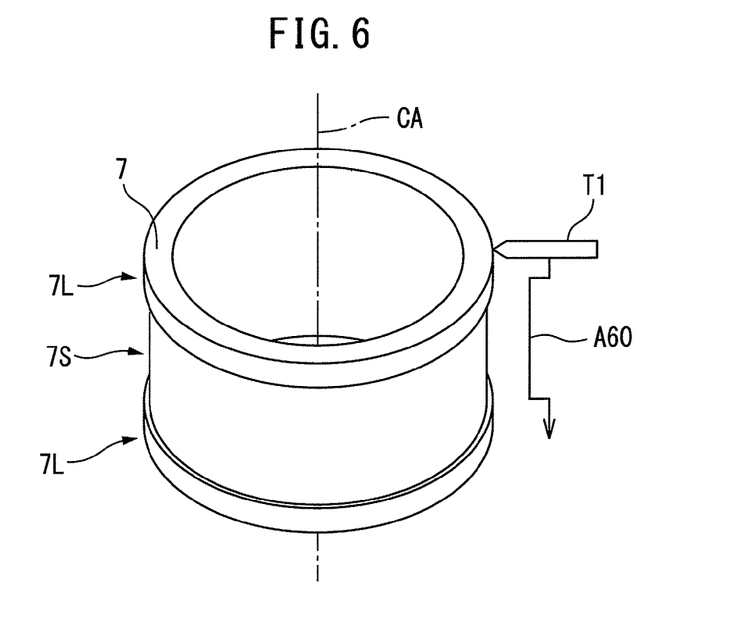
FIG. 6 is a second diagram for explaining a process of forming a core in an illustrative method of producing a rotor of the present embodiment.
Figure 7:
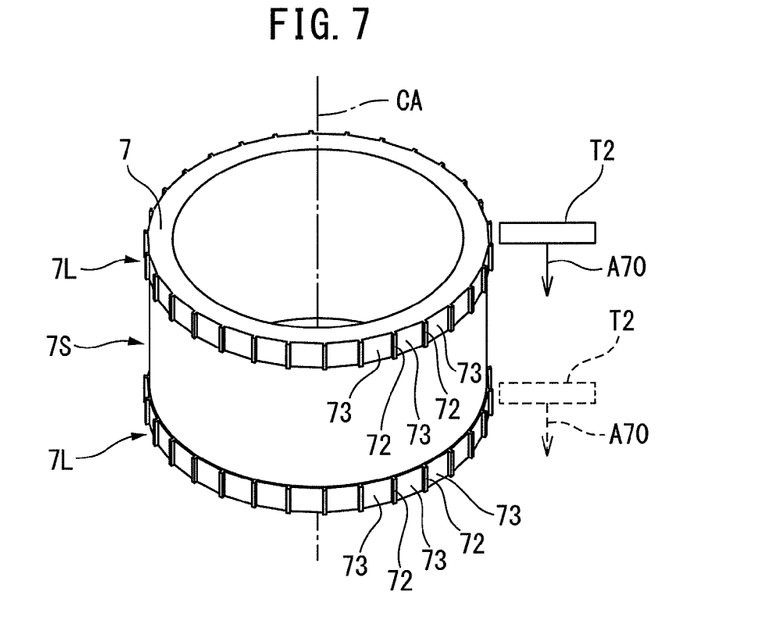
FIG. 7 is a third diagram for explaining a process of forming a core in an illustrative method of producing a rotor of the present embodiment.

Next, the method of producing the rotor 2 of the present embodiment will be explained. The method of producing the rotor 2 of the present embodiment includes a core forming process for forming a rotor core 20 which has the above-mentioned structure. FIG. 5 to FIG. 7 are diagrams for explaining the core forming process in an illustrative method of producing the present embodiment. As shown in FIG. 5, in the core forming process of the present example, first, a cylindrical member 7 to be worked into the rotor core 20 is prepared. The cylindrical member 7 of the present example is formed by cutting a metal pipe made of various metal materials vertically to its extension direction. Below, the direction parallel to the center axis CA of the cylindrical member 7 may be referred to as the "height direction" of the cylindrical member 7. As shown in FIG. 6, in the core forming process of the present example, next, lathe turning is performed on the outer circumferential surface 71 of the cylindrical member 7 so as to form a small diameter part 7S of the cylindrical member 7, and a large diameter part 7L of the cylindrical member 7 with an outside diameter larger than the small diameter part 7S. More specifically, during the above lathe turning, a cutting tool T1 which is movable parallel to the center axis CA is pushed against the outer circumferential surface 71 of the cylindrical member 7 so as to cut the outer circumferential surface 71 while the cylindrical member 7 is rotated about the center axis CA. During the lathe turning, the cutting depth of the cutting tool T1 is varied to form the outer circumferential surface 71 into a stepped shape as shown by the arrow A60, and thereby form the above-mentioned small diameter part 7S and large diameter part 7L of the cylindrical member 7. In the example of FIG. 6, the lathe turning on the cylindrical member 7 results in the formation of two large diameter parts 7L, 7L which are arranged one by one at both the end parts in the height direction of the cylindrical member 7, and one small diameter part 7S which is arranged between these large diameter parts 7L, 7L. However, the numbers and arrangement etc. of the small diameter part 7S and large diameter part 7L to be formed by the lath turning of the present example are not limited to the example of FIG. 6.

As shown in FIG. 7, in the core forming process of the present example, next, groove cutting is performed on each of the large diameter parts 7L, 7L of the cylindrical member 7 so as to form a plurality of grooves 73 which are arranged at equal intervals at the outer circumferential surfaces of the large diameter parts 7L. More specifically, during the above groove cutting, a cutting tool T2 for cutting the outer circumferential surface of the large diameter part 7L is moved in parallel with the center axis CA as shown by the arrow A70, to thereby form the individual grooves 73. Further, as a result of the above groove cutting, each of the plurality of projections 72 for positioning the plurality of magnets 4 is formed between two adjoining grooves 73. In this way, in the above groove cutting, only the large diameter parts 7L, 7L of the cylindrical member 7 are worked by the cutting tool T2, and therefore it is possible to reduce the machining man-hour for forming the plurality of projections 72 for positioning the plurality of magnets 4.

Next, referring to FIG. 8 and FIG. 9, a rotor of a second embodiment of the present invention will be explained. The rotor of the present embodiment has a configuration similar to the rotor of the above-mentioned first embodiment except for the parts which are specifically explained below. Therefore, parts which have configurations similar to the first embodiment are assigned the same reference notations as the first embodiment and explanations of the parts which have similar configurations will be omitted.

Figure 8:
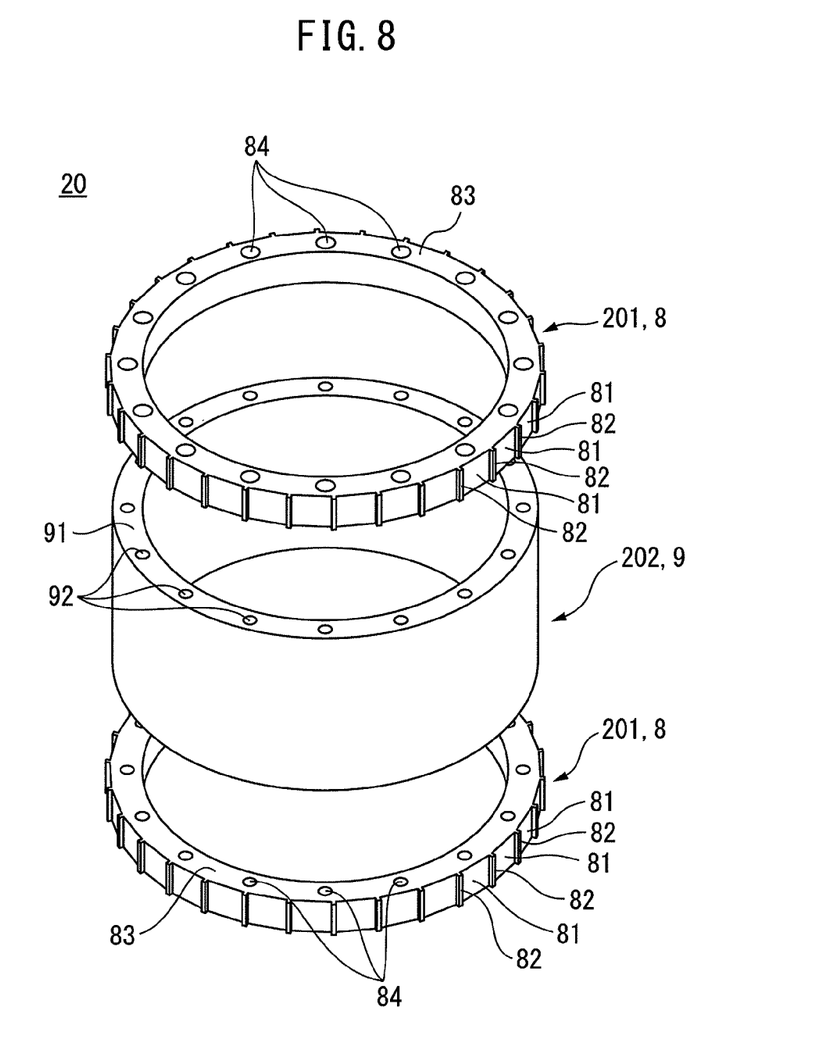
FIG. 8 is a disassembled perspective view which shows an exemplary rotor core in a rotor of a second embodiment of the present invention.

FIG. 8 is a disassembled perspective view which shows one example of a rotor core 20 in the rotor 2 of the present embodiment. As shown in FIG. 8, the rotor core 20 of the present example, in the same way as in FIG. 2, includes two projection-equipped cylindrical parts 201, 201 which are arranged one by one at both the end parts in the height direction, and one projection-less cylindrical part 202 which is arranged between these cylindrical part 201, 201. However, the three cylindrical parts 201, 201, 202 in the rotor core 20 of the present example are formed of separate members from each other, instead of being formed integrally like in FIG. 2. More specifically, the three cylindrical parts 201, 201, 202 in the rotor core 20 of the present example are separately formed from a pipe member made of various metal materials. Referring to FIG. 8, the core forming process for forming the rotor core 20 of the present example will be explained. In the core forming process of the present example, first, the two cylindrical members 8, 8 which are to be worked into the two projection-equipped cylindrical parts 201, 201 are prepared. Next, groove cutting is performed on the outer circumferential surfaces of these cylindrical members 8, 8 so as to form a plurality of grooves 81 which are arranged at equal intervals in the circumferential direction. Due to the groove cutting, each of the plurality of projections 82 for positioning the plurality of magnets 4 is formed between two adjoining grooves 81. Next, thread cutting is performed on one end face 83 in the height direction of each of the cylindrical members 8, 8, so as to form a plurality of through-type screw holes 84 which are arranged at equal intervals in the circumferential direction.

In the core forming process of the present example, next, another cylindrical member 9 to be worked into one projection-less cylindrical part 202 is prepared. Next, thread cutting is performed on both the end faces 91 in the height direction of the other cylindrical member 9, so as to form a plurality of blind-type screw holes 92 which are arranged at equal intervals in the circumferential direction. Next, the two cylindrical members 8, 8 are connected with the other cylindrical member 9, so as to assemble them into a rotor core 20 which includes two projection-equipped cylindrical parts 201, 201 and one projection-less cylindrical part 202. During the assembly, each of the two cylindrical members 8, 8 is connected with the other cylindrical member 9 by screw-type connecting members (not shown) which are inserted into the plurality of through-type screw holes 84. In this way, according to the rotor core 20 of the present example, it is possible to eliminate the lathe turning for forming a small diameter part and a large diameter part of the cylindrical member, and thus simplify the core forming process, as long as the two cylindrical members 8, 8 and the other cylindrical member 9 with suitable dimensions are prepared in advance.

Figure 9:
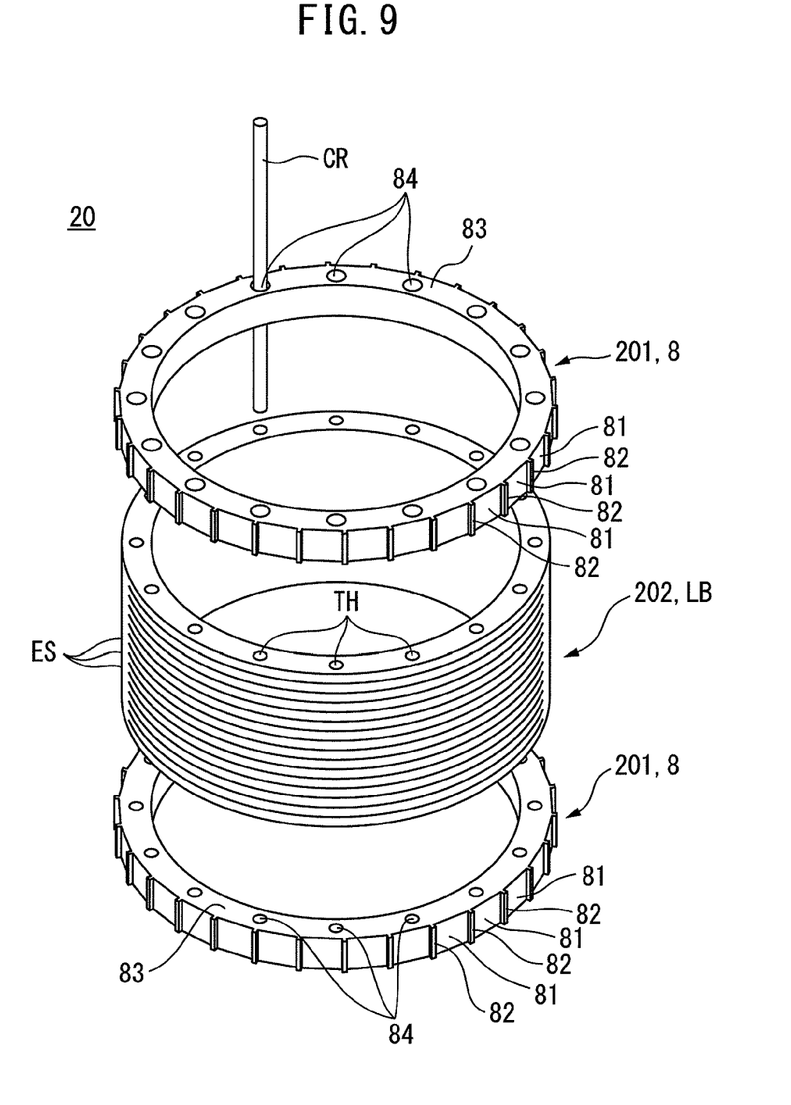
FIG. 9 is a disassembled perspective view which shows a modification of a rotor core in a rotor of the present embodiment.

FIG. 9 is a disassembled perspective view which shows a modification of the rotor core 20 in the rotor 2 of the present embodiment. The rotor core 20 of the present example, like in FIG. 8, includes two projection-equipped cylindrical parts 201, 201 which are arranged one by one at both the end parts in the height direction, and a single projection-less cylindrical part 202 which is arranged between them. These three cylindrical parts 201, 201, 202 are formed as separate members from each other. However, the projection-less cylindrical part 202 of the present example is formed of a laminate body comprising a plurality of electrical steel sheets which are stacked together, instead of being formed of a pipe member made of various metal materials. By employing a laminate body LB of electrical steel sheets as part of the rotor core 20 in this way, it is possible to reduce the eddy current inside of the rotor core 20, and thus suppress the amount of heat generation of the rotor core 20. Further, according to the rotor core 20 of the present example, in addition to the projection-less cylindrical part 202 or instead of the projection-less cylindrical part 202, at least one of the two projection-equipped cylindrical parts 201, 201 may also be formed of a laminate body of a plurality of electrical steel sheets.

The procedure of the core forming process for forming the rotor core 20 of the present example is similar to that of the core forming process for forming the rotor core 20 of FIG. 8 explained above. However, in the core forming process of the present example, rod-type connecting members CR are inserted into the plurality of through holes TH which are provided in the laminate body LB, so as to fasten the plurality of electrical steel sheets with each other. As shown in FIG. 9, such rod-type connecting members CR can be inserted through the plurality of through holes 84 at any one of the cylindrical members 8, 8, into the plurality of through holes TH at the laminate body LB. Further, the tip parts of the rod-type connecting members CR can be further inserted into the plurality of through holes 84 on the other cylindrical member 8. As a result, the rod-type connecting members CR can also be used to connect the laminate body LB which corresponds to the projection-less cylindrical part 202, with the two cylindrical members 8, 8 which correspond to the two projection-equipped cylindrical parts 201.

EFFECT OF INVENTION

According to the first, eighth and ninth aspects of the present invention, the formation area where the plurality of projections for positioning the plurality of magnets are formed is limited to only part of the rotor core in the height direction, and therefore it is possible to reduce the machining man-hour for forming these projections.

According to the second aspect of the present invention, the plurality of projections for positioning the plurality of magnets are formed at both the end parts in the height direction of the rotor core, and therefore it is possible to accurately position the plurality of magnets with respect to the rotor core.

According to the third aspect of the present invention, the plurality of projection for positioning the plurality of magnets are formed at a center part in the height direction of the rotor core, and therefore it is possible to accurately position the plurality of magnets with respect to the rotor core.

According to the fourth aspect of the present invention, clearances are formed between the confronting faces of the magnets and the outer circumferential surface of the projection-less cylindrical part of the rotor core so as to allow a binder to enter between them, and therefore it is possible to prevent the insufficiency of the bonding strength which acts on the magnets.

According to the fifth aspect of the present invention, the confronting faces of the magnets are further bonded to the bottom surfaces of the groove parts between adjoining projections, and therefore it is possible to stably fasten the magnets to the rotor core.

According to the sixth and 10th aspects of the present invention, it is possible to eliminate the lathe turning for forming a projection-less cylindrical part of the rotor core, and thus simplify the process of producing the rotor.

According to the seventh aspect of the present invention, it is possible to reduce the eddy current which may be generated inside of the rotor core, and thus suppress the amount of heat generation of the rotor core.

The present invention is not limited to only the above embodiments and can be modified in various ways within the scope of the claims. Further, the dimensions, shapes, materials, etc. of the above-mentioned parts are only examples. Various dimensions, shapes, materials, etc. can be employed for achieving the effects of the present invention.

The invention claimed is:

1. A rotor of an electric motor, comprising a cylindrically shaped rotor core, and a plurality of magnets which are arranged at predetermined intervals at an outer circumferential surface of said rotor core, wherein said outer circumferential surface of the rotor core is formed with a plurality of projections for positioning said plurality of magnets in the circumferential direction of said rotor core, each of said plurality of projections extends over only part of said outer circumferential surface of the rotor core in the height direction parallel to the rotation axis of said rotor core, said rotor core includes a projection-equipped cylindrical part which has an outer circumferential surface over which said plurality of projections extend, and a projection-less cylindrical part which has a curved outer circumferential surface over which said plurality of projections do not extend, said rotor core further includes a groove part which is positioned between two adjoining projections and has a flat bottom surface, each of said plurality of magnets has a flat confronting face which faces said outer circumferential surface of said rotor core, and the flat confronting face faces the flat bottom surface of said groove part of said projection-equipped cylindrical part while being bonded to the curved outer circumferential surface of said projection-less cylindrical part.

2. The rotor of an electric motor according to claim 1, wherein said projection-equipped cylindrical part is arranged at each of the both end parts in said height direction of said rotor core.

3. The rotor of an electric motor according to claim 1, wherein said projection-equipped cylindrical part is arranged at a center part in said height direction of said rotor core.

4. The rotor of an electric motor according to claim 1, wherein the flat confronting face of each of said plurality of magnets is further bonded to the flat bottom surface of the groove part.

5. The rotor of an electric motor according to claim 4, wherein said projection-less cylindrical part is a laminate body of electrical steel sheets.

6. A method of producing a rotor of an electric motor according to claim 4, comprising:

preparing a cylindrical member to be worked into said projection-equipped cylindrical part, preparing another cylindrical member to be worked into said projection-less cylindrical part, performing groove cutting along a center axis of said cylindrical member, on the outer circumferential surface of said cylindrical member, so as to form a groove part which is positioned between two adjoining projections, and joining together said cylindrical member and said other cylindrical member.

7. The rotor of an electric motor according to claim 1, wherein said projection-equipped cylindrical part and said projection-less cylindrical part of said rotor core are formed of separate members from each other.

8. An electric motor comprising a rotor according to claim 1.

9. A method of producing a rotor of an electric motor according to of claim 1, comprising:

preparing a cylindrical member to be worked into said rotor core, performing lathe turning about a center axis of said cylindrical member on the outer circumferential surface of said cylindrical member, so as to form a small diameter part of said cylindrical member, and a large diameter part with an outside diameter larger than said small diameter part, and performing groove cutting along said center axis on the outer circumferential surface of said large diameter part of said cylindrical member, so as to form a groove part which is positioned between two adjoining projections.

* * * * *